No. 869,746. PATENTED OCT. 29, 1907.
E. E. SPOTTSWOOD.
POT LID.
APPLICATION FILED APR. 12, 1906.

Witnesses
Augusta Viberg
Lulu E. Bulmahn

Inventor
Edwin E. Spottswood
By Chapin & Denny
His Attorneys

UNITED STATES PATENT OFFICE.

EDWIN E. SPOTTSWOOD, OF FORT WAYNE, INDIANA.

POT-LID.

No. 869,746.   Specification of Letters Patent.   Patented Oct. 29, 1907.

Application filed April 12, 1906. Serial No. 311,210.

*To all whom it may concern:*

Be it known that I, EDWIN E. SPOTTSWOOD, a citizen of the United States, residing at Fort Wayne, in the county of Allen, in the State of Indiana, have invented certain new and useful Improvements in Pot-Lids; and I do hereby declare that the following is a full, clear, and exact description of the invention, which will enable others skilled in the art to which it appertains to make and use the same, reference being had to the accompanying drawings, which form part of this specification.

My invention relates to improvements in pot lids or covers.

It is well known that in common use pot lids which are invariably of sheet metal, and as at present constructed, have no means for hanging them up when not in use, and have no means for lifting and handling them when highly heated in use, except the small centrally disposed wire bail, which in use generally becomes so hot that the operator has to employ a table ork to lift the lid and suspend it while examining the steaming contents of the pot on which it is used.

The object, therefore, of my invention is to provide a cheap, simple, convenient pot lid having an improved means that will enable the operator to hang it up when not in use, and to conveniently lift and suspend the lid in use, without the aid of a table fork or other tool, and without danger of burning or steaming the hand of the operator and which means can readily be folded into a compact diametric position for shipment or storage.

My present invention consists of a pot-lid body of the usual contour and construction, on the upper face of which is pivotally mounted a radially arranged handle, provided with adjustable means for forming a holding engagement with the adjacent edge of the lid.

The principal novel feature of my invention resides in the construction and coöperation of the pivoted handle and the means for securing the same in its radially extended position for use.

Figure 1:
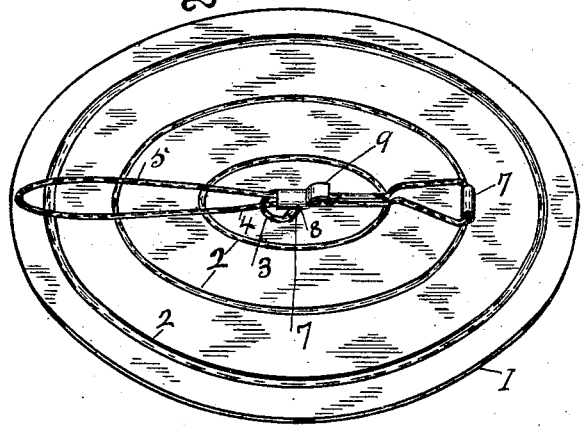
Figure 2:
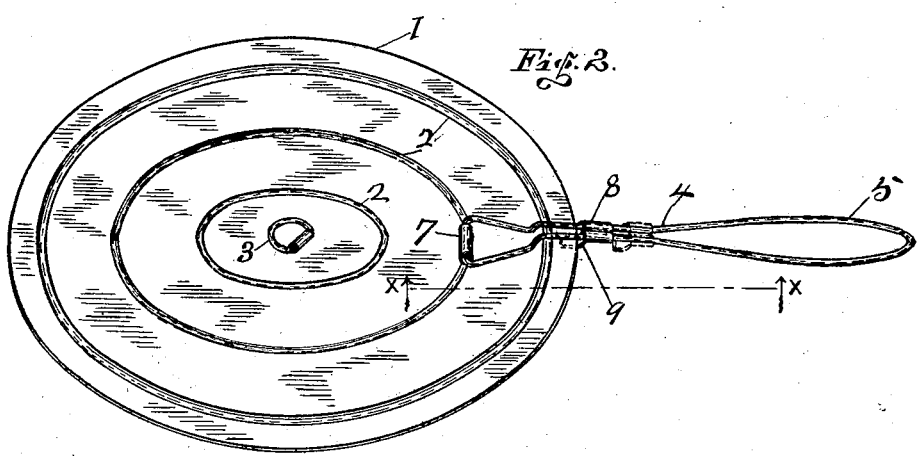
Figure 3:
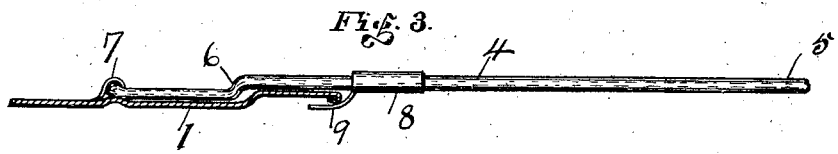
Figure 4:
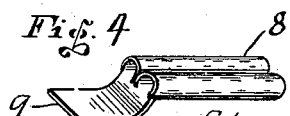

Similar reference numerals indicate like parts throughout the several views, in which Figure 1 is a perspective view of my invention with the pivoted handle in the position proper in packing the lid for shipment or storage. Fig. 2 is also a perspective view of the same, showing the pivoted handle in its rigid holding position, and also showing the lid engaging means in dotted outline at the limit of its outward adjustment. Fig. 3 is an enlarged detail side view of the pivoted handle in its holding engagement with the lid, which is in vertical section on the line x-x of Fig. 2, and the outer end of the handle being broken away. Fig. 4 is an enlarged perspective detail of the longitudinally adjustable lid engaging means.

The lid 1 of any proper form, dimensions and material is preferably of the usual contour and provided with the concentric strengthening beads 2, and the centrally arranged pivoted wire bail or handle 3 of the usual construction.

My improved handle 4 of any proper form and material is preferably made of a single piece of wire whose ends are brought together at its forward end in any suitable manner. The outer end 5 of the handle 4 is in the form of a loop to give it greater strength, afford a proper hand hold, and afford a convenient means for hanging up the lid when not in use.

The handle 4 near its inner end, is preferably vertically bent, as shown at 6 in Fig. 3, to better conform to the usual irregularity of the pot lid surface, and it has its inner end pivotally mounted in a suitable fixed bearing 7 on the upper face of the lid at a suitable distance from the edge of the lid.

On that portion of the handle which is adjacent to the edge of the lid when extended, is slidably mounted the means for rigidly securing the handle 4 in its extended position, and consists of a clip 8 which is adjustably mounted on the handle in any suitable manner, and is provided upon its forward end with a pendent forwardly extended lip 9 adapted to form a holding engagement with the adjacent edge of the lid, as shown in Figs. 2 and 3.

The manner of employing my invention thus described is obvious, and briefly stated is as follows: When it is desired to pack my improved lids compactly in quantities for shipment or storage, the handle 4 is thrown back upon the lid in the position shown in Fig. 1. The housekeeper can also readily place the pivoted handle in that position if desired when the lid is not in use.

When it is desired to use the lid in the usual manner the operator swings the handle 4 outwardly into the extended position shown in Fig. 2, with the engaging clip 8 in the position shown in dotted outline, after which he slips or adjusts the clip forward into its holding position, shown in Figs. 2 and 3 with the lip 9 firmly engaged with the lower face of the adjacent beaded edge of the lid 1. In this position the handle 4 will be kept at all times comparatively cool, and the lid can be handled and inverted at pleasure without danger of burning or steaming the hand. By leaving the handle in this rigid extended position it forms a very convenient means for suspending the lid from a hook or nail, which cannot be done with pot lids as at present constructed.

While the clip shown in Figs. 3 and 4 is the preferred form which I employ, many other modified forms of such holding means can readily be devised without departing from the spirit and scope of my invention, which consists in a pot lid or vessel cover consisting of a single circular plate provided with a hinged handle adapted to rest upon the lid diametrically for shipment or storage, and to be rigidly secured in an extended radial position for use.

Having thus described my invention and the manner of employing the same, what I claim as my invention and desire to secure by Letters Patent is:

A vessel cover formed of a single plate; a handle hinged upon the upper face of the cover between its center and its perimeter, whereby it is adapted to be folded diametrically thereon substantially within its circumference, the said handle being also adapted to be extended in a radial position; and means for securing the handle in its extended position, consisting of a longitudinally slidable clip mounted on the handle and provided with a projecting lip adapted to holdingly engage the lower face of the cover at its perimeter.

Signed by me at Fort Wayne in the county of Allen State of Indiana this 2nd day of April A. D. 1906.

EDWIN E. SPOTTSWOOD.

Witnesses:
AUGUSTA VIBERG,
ETHEL M. COOKE.